United States Patent

[11] 3,575,335

[72] Inventor Hans Baden
 St. Albert, Alberta, Canada
[21] Appl. No. 769,993
[22] Filed Oct. 23, 1968
[45] Patented Apr. 20, 1971
[73] Assignee Custom Glass Ltd.
 Edmonton, Alberta, Canada
 Continuation-in-part of application Ser. No.
 519,687, Jan. 10, 1966.

[54] APPARATUS FOR MAKING WINDOW SPACER CORNER CONNECTIONS
 4 Claims, 5 Drawing Figs.
[52] U.S. Cl. ................................................ 228/40,
 29/476, 49/504, 228/36, 228/44, 228/56, 248/208
[51] Int. Cl. ...................................................... B23k 1/08
[50] Field of Search .......................................... 228/36, 40,
 44, 56; 29/476; 49/504; 248/208

[56] References Cited
UNITED STATES PATENTS

| 297,629 | 4/1884 | Perkins | 228/40 |
| 2,255,151 | 9/1941 | Clements | 29/476X |
| 2,464,514 | 3/1949 | Kaufmann | 29/476X |
| 3,226,821 | 1/1966 | Van Dijk et al. | 228/36X |

Primary Examiner—John F. Campbell
Assistant Examiner—Robert J. Craig
Attorney—Ernest Peter Johnson ABSTRACT: An apparatus for forming the ends of two window spacers into a mitred corner and dipping the corner in solder to effect a seal is provided. A V-notched jig receives the spacer ends to guide them into mitred, abutting relationship. A clamping jig locks the spacers in this position. The clamping jig is vertically movable to dip the corner into molten solder.

Patented April 20, 1971 3,575,335
2 Sheets-Sheet 1
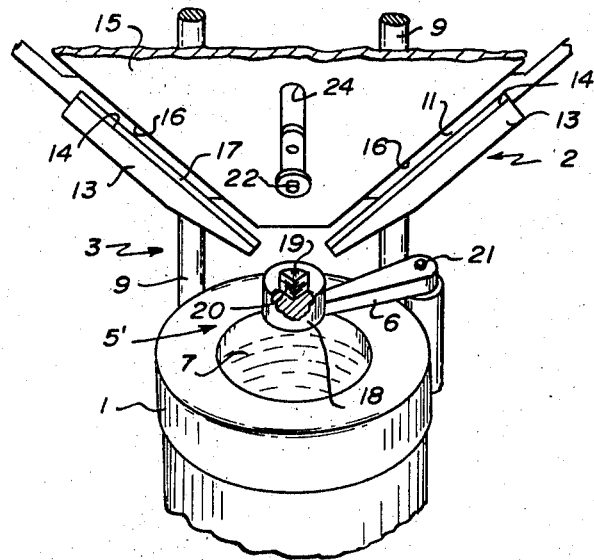
Fig. 1.
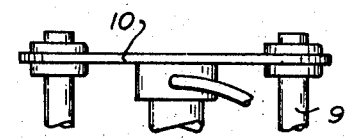
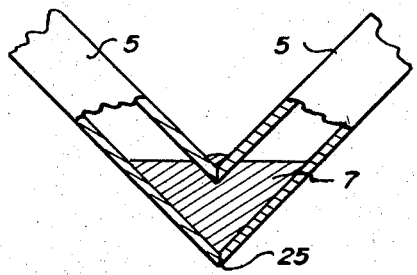
Fig. 5.
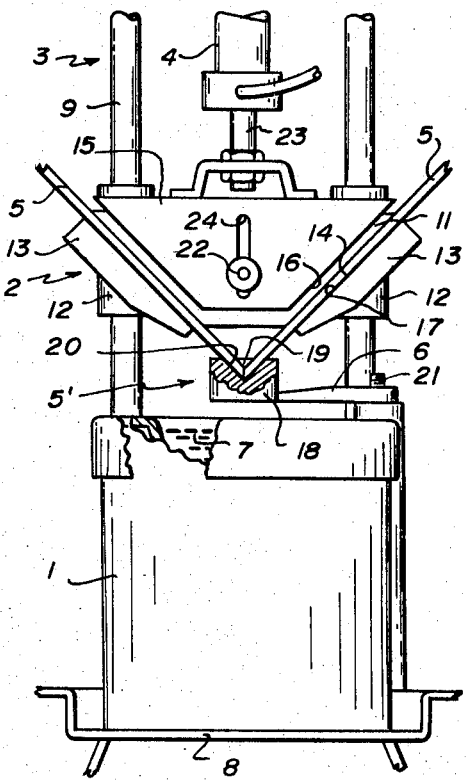
Fig. 2.

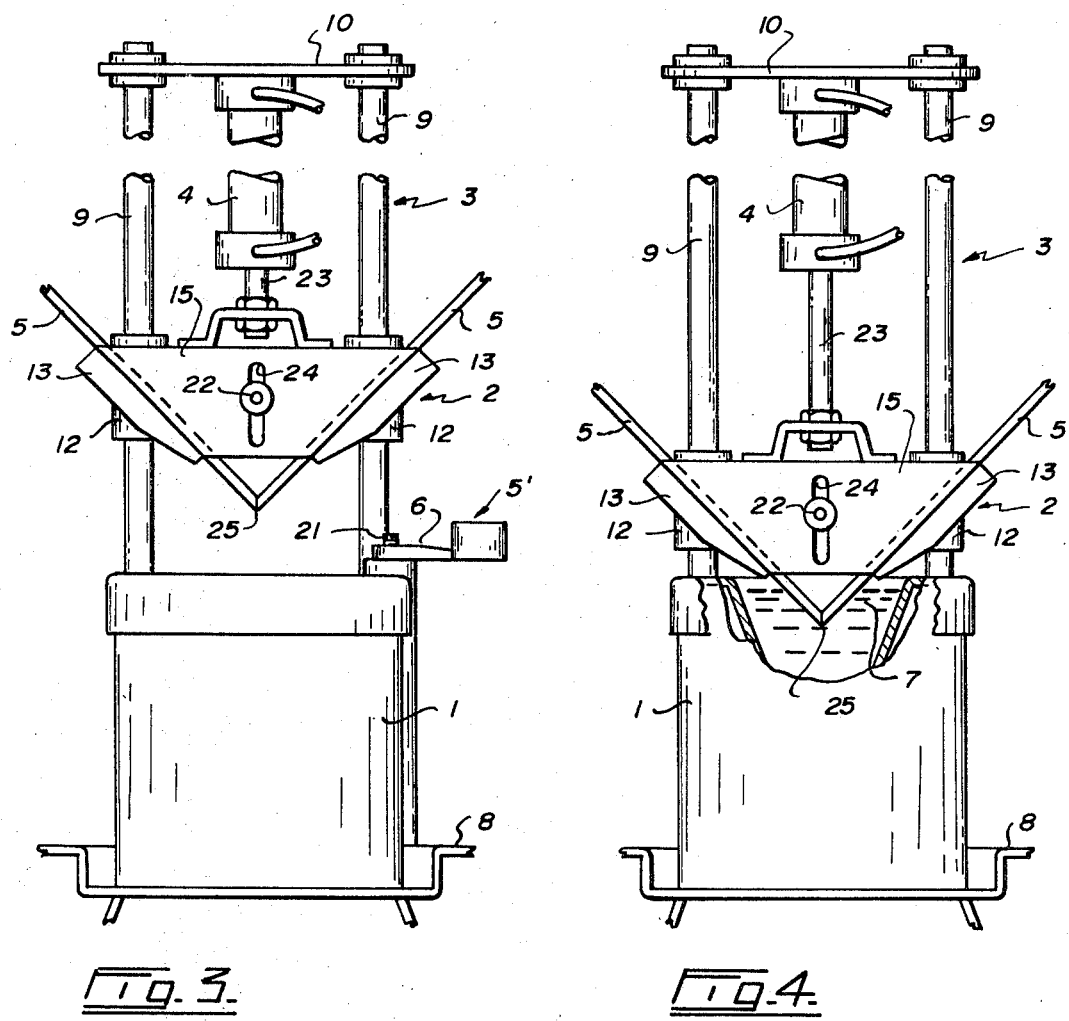

APPARATUS FOR MAKING WINDOW SPACER CORNER CONNECTIONS

This application is a continuation-in-part of application Ser. No. 519,687 filed Jan. 10, 1966.

BACKGROUND

This invention relates to an apparatus for sealing and connecting together the ends of a pair of window spacer lengths in mitred abutment.

A double glazed window unit includes two spaced glass planes having a peripheral spacer between them. The spacer is commonly made up of four lengths of hollow aluminum tubing of rectangular section. These lengths are connected together at their ends for form mitred corners.

It is necessary to completely seal off the space between the panes. If this is not done, air, carrying moisture, will get into the space and the moisture will condense therein. Fogging of the window results.

According to common practice, a sealant is therefore provided between the inner surface of each glass pane and the adjacent contacting surface of the spacer. Additionally, the spacer lengths are filled with desiccant. This leaves only the narrow crack at the apex of the mitred corners to be sealed off.

Now, the connecting together of the spacer lengths at their abutting ends and the sealing of the apex crack have long been expensive and troublesome operations for the window industry.

One method employed to effect connection and sealing has involved clamping the ends together and welding them from the outside. There are disadvantages to this method. For example, use of the technique results in an exterior bead which must be ground off flush with the outer surface of the spacer. Furthermore, the method is slow and does not lend itself to automation. Finally, oxidation of the aluminum occurs during welding and this is deleterious.

Another method involves inserting a "corner lineup" into the spacer length ends to draw them into a correctly mitered position. The mitered corner is then dipped in molten solder. The solder fills the space between the lineup and the interior wall surfaces of the spacer lengths and plugs the apex crack to effect a seal. However, the use of a lineup has disadvantages. For example, the lineups themselves are relatively expensive. They have to fit very snugly within the spacer lengths in order to properly position them; as a result the solder may not penetrate between lineup and spacer to the extent needed to give a good seal and connection.. Additionally, the air space between the lineup and spacer wall tends to insulate the lineup from the heat of the molten bath. As a result, the solder will not run readily on the cold lineup surface. This again can result in a poor seal and connection.

With the foregoing in mind, it is the primary object of this invention to provide an apparatus which will mechanically line up the ends of two spacer lengths in a mitered abutting relationship; which will lock them in that state; which will then submerge the formed corner in molten solder for a period of time to permit the solder to enter its interior; and which will then withdraw the mitered ends from the solder and hold them in the said position for a period to time to enable entrapped solder to solidify and form a desirable seal and connection.

SUMMARY

The present invention provides an apparatus which achieves the foregoing objects, It is comprised of the following combination: An open topped, heated vessel containing molten solder; a corner-forming member adapted to guide the ends of two spacer lengths into mitered, abutting relationship; a clamping member adapted to lock the ends in the mitered position; and means adapted to move the clamping member so as to submerge the mitered corner in the solder to permit solder to flow thereinto whereby, when the corner is withdrawn, entrapped solder will cool and solidify to seal the corner and connect the spacer length.

In greater detail, the corner-forming member may comprise a jig of open-topped, V-shaped configuration having one transverse wall. The jig is mounted on a member movable between two positions: An operating position wherein the jig is located over the solder and beneath the clamping member, and an inoperative removed position. The clamping member may include a pair of angularly disposed, fixed support surfaces and a pair of clamping surfaces, each clamping surface being adapted to coact with one support surface to clamp a spacer length between them. The clamping surfaces are movable between the operative clamping position and an inoperative removed position. The clamping member is constructed in a manner whereby the mitered corner extends therebelow for dipping purposes.

DESCRIPTION OF THE DRAWINGS

In the drawings:

FIG. 1 is a perspective view of the invention showing the clamping and lineup jigs in the operative position for receiving spacer lengths;

FIG. 2 is a front, partly broken-away view of the invention showing the clamping jig in the open position and two spacer lengths in mitered, abutting relationship in place;

FIG. 3 is a front view showing the spacer lengths locked in the clamping jig and the lineup jig removed to the inoperative position;

FIG. 4 is a partly broken-away front view of the invention showing the mitered corner submerged in solder;

FIG. 5 is a partly broken-away view of the mitered corner after joining showing the location of the solidified solder.

DESCRIPTION OF THE PREFERRED EMBODIMENT

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the embodiment illustrated in the drawings, a solder container 1 is shown. A clamping member or jig 2 is slidably mounted on framework 3 over container 1. A piston-cylinder assembly 4 is carried by framework 3. It acts to actuate clamping jig 2 to lock spacer lengths 5 in a mitered position. It also acts to move clamping jig 2 up and down relative to solder container 1. A lineup jig 5' is carried on swingable arm 6. In the operative position, wherein it is lined up beneath clamping jig 2, jig 5' will receive the ends of length 5 and guide them into a mitered, abutting relationship.

In greater detail, solder container 1 is a double walled vessel having heating coils located between the walls. The solder 7 will be maintained in the molten condition at a temperature above its melting point. The container 1 may be mounted on a support 8, as shown, to avoid spillage on the floor.

A tubular framework 3 extends upwardly from the rear of container 1. This framework consists of vertical, parallel posts 9 and horizontal crossmember 10. Framework 3 serves to carry clamping jig 2.

Clamping jig 2 is slidably mounted on posts 9. It includes a transverse, vertical framework member 11 attached at each of its ends to one of the sleeves 12. Sleeves 12 are, in turn, slidably mounted on posts 9. A pair of angularly disposed elements 13 extend forwardly from frame member 11 and are secured thereto. Elements 13 define open grooves 14 which are adapted to receive spacer lengths 5 so that they are supported and disposed toward each other at a right angle. A V-shaped clamping plate 15, having clamping surfaces 16, is slidably mounted for vertical movement on frame member 11. Clamping surfaces 16 are disposed parallel to the support surfaces 17 of grooves 14.

Turn now to FIG. 1, which shows lineup jig 5 to best advantage. Jig 5' is comprised of notched member 18 having a transverse wall 19 extending across the rear of the V-shaped notch 20. Member 18 is mounted on a swingable arm 6 so that it may be moved between operative and inoperative positions. In the operative position, jig 5' is centrally located over solder 7. In addition, it is disposed beneath clamping jig 2 so that notch 20 is adapted to receive the ends of spacer lengths 5 and guide them into abutting, mitered relation. In the inoperative position, jig 5' will be swung to a removed location out of the path of the clamping jig 2 and spacer lengths 5. Suitable means, such as a piston-cylinder assembly (not shown) may be used to swing lineup jig 5' back and forth between positions. In addition, member 18 should be vertically adjustable; this may be accomplished by threadably mounting it, as on supporting bolt 21.

A vertically disposed piston-cylinder assembly 4 is secured at its upper end to crossmember 10 and at its lower end to clamping plate 15. The extent of downward movement of plate 15 due to expansion of assembly 4 is limited by pin 22, attached to piston 23, moving in plate slot 24. This limitation is designed so that clamping surfaces 16 will coact with support surfaces 17 to just firmly clamp spacer lengths 5 therebetween when in the closed position. Upon removal of lineup jig 5' to the inoperative position, further expansion of assembly 4 will cause clamping jig 2 to move downwardly to submerge corner 25. Contraction of piston-cylinder assembly 4 will, of course, withdraw corner 5 from solder 7. Further contraction will move clamping plate 15 to the fully open position and release spacer lengths 5.

In operation, lineup jig 5' will be swung into the operative position. A pair of spacer lengths 5 will then be placed in grooves 14. Support surfaces 17 will form the lengths into a right angle. The ends of lengths 5 will be forced into a mitered, abutting position by notch 20. Expansion of piston-cylinder assembly 4 will cause the lengths to be clamped between surfaces 16, 17. The V-shaped notch 20 and wall 19 of jig 5' will prevent the ends of the flexible tubular lengths 5 from becoming misaligned when clamping takes place. The piston-cylinder assembly 4 is then further expanded to cause clamping jig 2 to move downwardly until mitered corner 25 is submerged in solder 7. After leaving corner 25 submerged for a period of time sufficient to allow the desired amount of solder to enter its interior, assembly 4 is contracted to raise corner 25 from the solder. Corner 25 may then be blasted with air to cool the entrapped solder and allow it to solidify. Further expansion of assembly 4 will slide clamping plate 15 sufficiently far enough above grooves 14 so as to allow the joined lengths 5 to be removed.

The advantages of the device are several. One operator can, in a few seconds, make a corner connection; this operation formerly took several minutes. The joint itself, as shown in FIG. 5, is particularly airtight and strong. There are no exterior residues to be removed.

I claim:

1. An apparatus for soldering together the ends of two window spacer lengths in abutting, mitered relationship which comprises, in combination:
    an open-topped container for holding solder in a molten condition;
    a corner-forming member, movable between an operative position over the solder and an inoperative removed position, adapted, when in the operative position, to receive the two lower ends of the spacer lengths and to guide them into a mitered, abutting relationship;
    a vertically movable clamping member, disposed over the corner-forming member when it is in the operative position, having a pair of angularly disposed support surfaces, for supporting the spacer lengths in the mitered position, and a pair of clamping surfaces, each clamping surface being disposed adjacent one support surface, said adjacent clamping and support surfaces being movable relative to one another from an engaged position, wherein the clamping member coacts with the adjacent support surface to clamp a spacer length therebetween, to a nonengaged position.

2. The apparatus as defined in claim 1 wherein:
    the corner-forming member defines a V-shaped notch for receiving the ends of the spacer lengths and guiding them into the said relationship.

3. The apparatus as defined in claim 2 wherein:
    the corner-forming member is mounted on an arm movable between the operative and inoperative positions.

4. An apparatus for soldering together the ends of two window spacer lengths in abutting, mitered relationship which comprises, in combination:
    an open topped container for holding solder in a molten condition;
    a framework, adjacent to and extending above the container;
    an assembly, comprising a swingable arm carrying a corner-forming member defining an upwardly opening, V-shaped notch, mounted adjacent the container, said arm being movable to an operative position over the solder;
    a clamping member, slidably mounted on the framework for vertical movement and disposed over the corner-forming member when it is in the operative position, said clamping member comprising a fixed plate carrying a pair of angularly disposed support surfaces, and a movable plate slidably superimposed on and connected to the fixed plate, having a pair of angularly disposed clamping surfaces, each said clamping surface adapted to coact with a supporting surface to clamp a spacer length therebetween;
    a piston-cylinder assembly, connected to the movable plate, adapted to bias the movable plate between disengaged and clamping positions and to bias the clamping member up and down on the framework so as to submerge the ends of the spacer lengths in the solder and to raise them out of the solder; and
    hydraulic means for actuating the piston-cylinder assembly.